Figures 1, 2, 3:
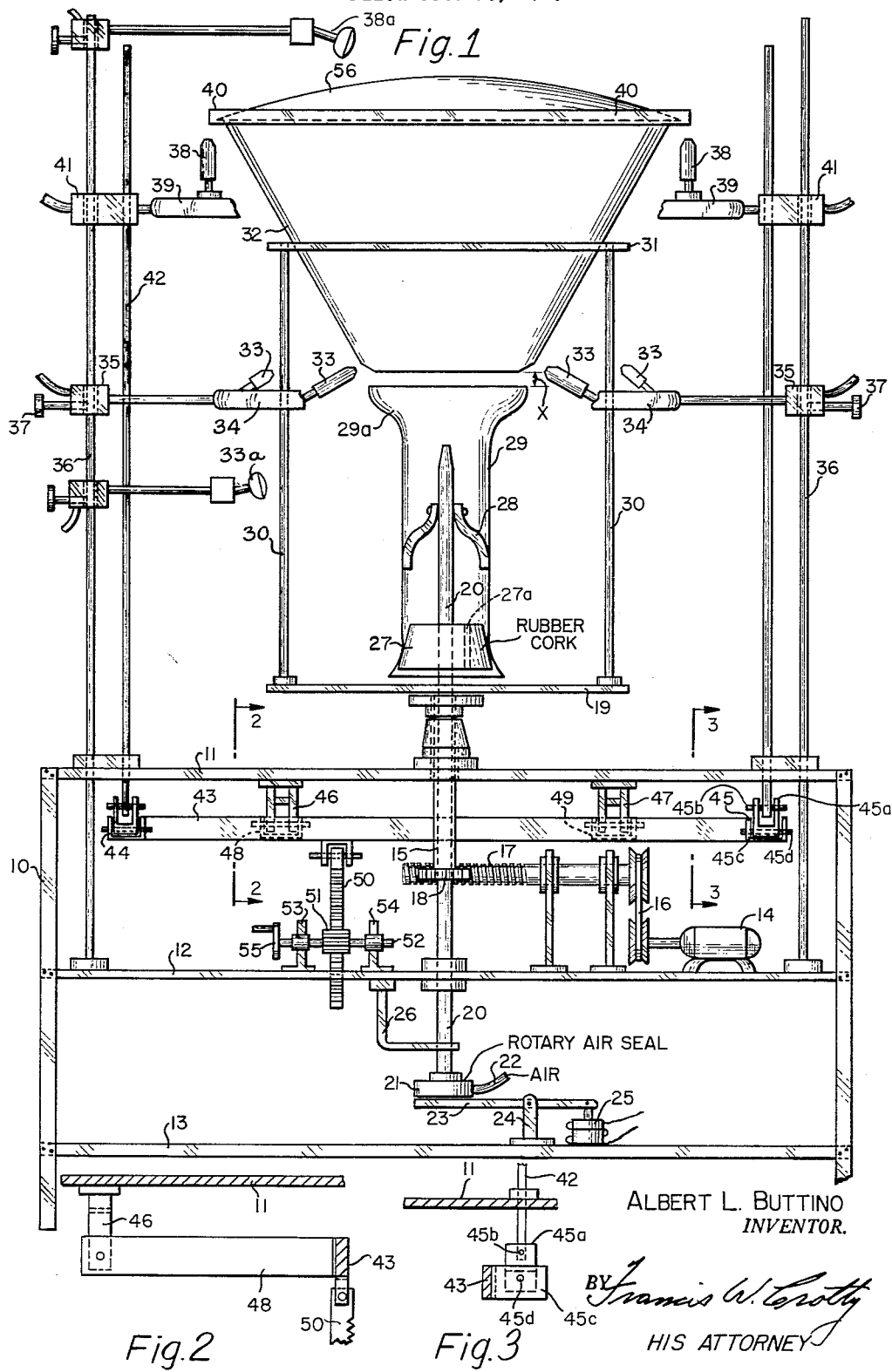

Aug. 16, 1955     A. L. BUTTINO     2,715,298
CATHODE-RAY TUBE SEALING APPARATUS
Filed Oct. 19, 1949

ALBERT L. BUTTINO
*INVENTOR.*

BY Francis W. Crotty
*HIS ATTORNEY*

United States Patent Office 2,715,298
Patented Aug. 16, 1955

2,715,298

CATHODE-RAY TUBE SEALING APPARATUS

Albert Louis Buttino, San Francisco, Calif., assignor to The Rauland Corporation, a corporation of Illinois Application October 19, 1949, Serial No. 122,231

7 Claims. (Cl. 49—1)

This invention relates to improved apparatus for the fabrication of cathode-ray tubes of the type having an envelope comprising a neck portion of vitreous material such as glass, a metallic conical portion, and a transparent window or viewing plate of glass or similar transparent plastic. More particularly, this invention is directed to improved apparatus for the formation of glass-to-metal seals in the fabrication of envelopes for such tubes.

In cathode-ray tubes of the above-described type, the metallic conical portion of the envelope is usually provided with a flange or lip about its larger rim in which the glass window is fitted for sealing to the cone. To obtain a satisfactory seal, it is preferable that the conical portion be held with its axis in a vertical position and with the flange directed upwardly, the window being placed on the cone in contact with the flange. Gas flames may then be directed upon the flange of the metal cone while the cone is rotated about its axis for uniformity of heating. The glass of the window at the point of contact with the flange softens and settles in the flange sealing the window to the cone.

Previously in the art, it was considered necessary that the cone be placed in a horizontal lathe, or other suitable apparatus, with its axis in a horizontal position to effect sealing of the vitreous neck portion to the smaller end of the metal cone. In accordance with the prior practice, the vitreous neck is brought into juxtaposition with the small end of the cone overlapping it slightly and gas flames are directed onto the overlapping area, the cone and neck being rotated in unison for uniform heating. The portion of the glass overlapping the cone softens and adheres to the metal cone completing a seal between the neck and cone.

Heretofore, it has been considered infeasible to seal the vitreous neck portion of a cathode-ray tube to the metal cone portion with the axes of these portions in vertical alignment and with the cone above the neck. This was a logical conclusion since in the prior art sealing processes, the rim of the neck portion was heated to a molten state, and if this were done in such a vertical array the molten glass would run due to gravity and render sealing impractical. Because of this conclusion, the sealing processes heretofore utilized have been extremely cumbersome and costly.

In accordance with the afore-described prior processes, it is necessary to undergo two separate and distinct operations in two separate machines to fabricate the envelope of the cathode-ray tube. The cone is initially placed in a first machine with its axis in a vertical position and its large end extending upwardly to seal the glass window to this large end. The assembly is then removed, annealed and allowed to cool. It is then placed in a second machine with its axis in a horizontal position so that the glass neck may be sealed to the small end of the cone, as already set forth. Once this operation is completed, the envelope is again placed in an annealing oven. Care must be taken during the second operation that the previously sealed window is not destroyed during the neck sealing operation. In addition, the envelope must be brought gradually to the sealing temperature in each of the operations to avoid cracking of the glass. Such processes, employing a plurality of separate machine operations and a time consuming heating interval incident to each operation, are obviously cumbersome and costly.

Copending application Serial No. 121,564 filed October 15, 1949, entitled "Cathode-Ray Tube Sealing Process," in the name of Albert L. Buttino and Howard R. Patterson, now U. S. Patent No. 2,639,555 dated May 26, 1953, and assigned to the present assignee, is predicated on the premise that it is both possible and expedient to seal the vitreous neck portion of the envelope to the metal conical portion with the axis of the cone held in a vertical position over the neck. In accordance with the teachings of the above-mentioned application, the metallic cone, composed for example of chrome steel, is placed in a vertical position with its large end upward, and the vitreous neck is positioned coaxially with but below the cone with its upper rim spaced from the small end of the cone. Both components are preferably rotated in unison for uniform heating. Gas burners, or other suitable heating elements, are utilized to heat locally the small end of the cone with the result that the adjacent portion of the neck is heated by radiation or "splash" heat from the small end of the cone until this adjacent portion reaches a plastic state but not a molten state so that the glass does not "run."

After the adjacent portion of the neck has reached a plastic state and chrome oxide has been formed on the small end of the metal cone due to the heating process, the neck is then slowly moved upwardly against the heated lower end of the cone. Upon contact with this heated end, the inside surface of the glass neck touching the cone becomes more plastic and, due to the affinity of the glass to the oxide, this surface creeps slightly against gravity up this end of the conical portion. When the glass neck contacts the heated end of the cone, the heating elements are turned off and the glass settles about this end sealing the neck to the cone.

The process of the afore-mentioned copending application provides that the neck be sealed to the metallic cone with these components positioned vertically and with the larger end of the cone upward. This enables the glass window also to be sealed to the metal cone without the need for further positioning of the cone. Therefore, in accordance with a preferred embodiment of the process, the glass window is placed in the flange around the larger end of the cone before the neck sealing operation is carried out. During the afore-described neck sealing operation, the heating elements heat the cone and heat is conducted and radiated to the glass window placed at the large end. In this manner, the glass window is slowly heated to a temperature high enough so that the heater elements may now be applied to the flange for sealing the glass window without fear of cracking it.

The present invention provides apparatus for fabricating a cathode-ray tube in accordance with the process disclosed and claimed in the afore-mentioned copending application.

It is, accordingly, an object of this invention to provide improved apparatus useful in the fabrication of cathode-ray tube envelopes for sealing together the various components constituting such envelopes.

It is a further object of this invention to provide such improved apparatus for sealing together the various components of a cathode-ray tube envelope more quickly and economically than apparatus formerly used for such operations.

Yet another object of this invention is to provide apparatus useful in the fabrication of a cathode-ray tube envelope for sealing together in a single mechanism a plurality of components constituting such an envelope.

A more specific object of this invention is to provide apparatus useful in the fabrication of cathode-ray tube envelopes for sealing together a metallic truncated cone member, a vitreous neck member, and a glass viewing plate in a single mechanism.

The features of this invention which are believed to be new are set forth with particularity in the appended claims. The invention itself, however, together with further objects and advantages thereof may best be understood by reference to the following description when taken in conjunction with the accompanying drawings in which Figure 1 illustrates a preferred embodiment of the invention, and Figures 2 and 3 represent sections of the apparatus of Figure 1 taken along the lines 2—2 and 3—3 respectively.

With reference to Figure 1, the illustrated apparatus includes a table 10 having a top 11 and shelves 12 and 13. An electric motor 14 is mounted on the shelf 12 to rotate a drive tube 15 by way of a belt drive 16, worm 17, and pinion 18 fixed to the drive tube. The drive tube 15 has a spindle 19 mounted thereon so that rotation of this tube by the motor 14 causes the spindle to rotate.

An air tube 20 is slidably mounted concentrically within the drive tube 15 and extends upwardly beyond the drive tube and spindle 19. The frictional engagement between the air tube 20 and drive tube 15 is sufficient so that rotation of the tube 15 causes the tube 20 to rotate in unison therewith. A rotary air seal 21 of well-known construction is mounted on the lower extremity of the air tube, and air is introduced into the air tube from a source (not shown) through a rubber tube 22. A lift arm 23 is mounted on a pivot 24 secured to the shelf 13. One end of the lift arm 23 is coupled to the plunger of a solenoid 25, and the other end bears against the underside of the air seal 21. Therefore, energization of the solenoid 25 causes the arm 23 to pivot on the pivot 24 and the air tube 20 to move upwardly. The upward motion of the air tube 20 is limited by a bracket 26 suspended from the shelf 12.

The upper portion of the air tube 20 has a rubber cork 27 and resilient fingers 28 secured thereto to support the vitreous neck portion 29 of a cathode-ray tube envelope. The rubber cork 27 also acts as an air seal for the lower end of the neck 29. A pair of spindle rods 30 are mounted on the spindle 19 and extend upwardly to support an annular bracket 31 at their uppermost extremities. The bracket 31, in turn, serves as a support for the metal conical portion 32 of a cathode-ray tube envelope.

A first group of gas burners 33 are mounted on a ring 34 surrounding the assembly 29, 32, and this ring is supported by collars 35 adjustably mounted on vertically extending guide rods 36. The position of the rings 34 and, therefore, of the burners 33 may be adjusted by loosening set screws 37 and moving the collars 35 along the guide rods 36. A second group of gas burners 38 are mounted on a ring 39 surrounding the upper section of the conical portion 32 and directed upwardly to a flange 40 formed around the large upper rim of the conical portion. The ring 39 is guided by the guide rods 36 by means of collars 41 slidably mounted thereon, these collars being fixed to a pair of lift rods 42. The lift rods 42 extend through the top 11 of table 10 and are coupled to a lift frame 43 through linkage arrangements 44 and 45. A side view of linkage arrangement 45 is shown in Figure 3. The arrangement comprises a U-shaped member 45a pivoted to lift rod 42 by means of a pin 45b, and a further U-shaped member 45c secured to frame 43 and pivoted to member 45a by a pin 45d. Linkage arrangement 44 may be similar to the above-described arrangement. The frame 43 is pivoted to the table top 11 by pivots 46 and 47 coupled to backwardly extending arms 48 and 49 of the frame, as shown in Figure 2. The frame 43 is further coupled to a rack 50 having a pinion 51 in operative engagement therewith. The pinion 51 is mounted on a shaft 52 extending through brackets 53—54 which, in turn, are mounted on the shelf 12. An operating handle 55 is fixed to the shaft 52. Rotation of the handle 55 in one direction raises the frame 43 and the burner ring 39 to its uppermost, or sealing, position (shown in the drawing); and rotation of the handle in the other direction lowers the frame 43 and the burner ring 39 to its lowermost position to enable an operator to remove the cathode-ray tube envelope from the machine.

The operation of the apparatus is as follows: The gas burners 33, 38 are turned off (or to a low pilot level) and solenoid 25 is de-energized. The handle 55 is rotated so that the burner ring 39 is in its lowermost position. The vitreous neck 29 is placed securely on the fingers 28 and rubber cork 27. The metal conical portion 32 is placed in the bracket 31 and a glass window 56 is placed in the flange 40.

Since the solenoid 25 is de-energized the air tube 20 is in its lowermost position, and the apparatus is so proportioned that when the air tube is in this position the neck 29 is spaced from the conical portion 32 a small distance $x$, for example $5/16''$. The neck 29 and conical portion 32 are rotated in unison by means of the motor 14, a soft flame may be played over the upper flared section 29a of neck 29 from a burner 33a to heat gradually this section and, when this section is sufficiently heated, the gas burners 33 are ignited and directed onto the lower section of conical portion 32. At the same time a soft bushy flame may be played over the top surface of window 56 by a burner 38a to insure uniform heating of the window. When the glass rim of the section 29a reaches a plastic state, due to heat radiation from the lower section of the conical portion, the solenoid 25 is energized from any suitable source causing the air tube 20 to rise slowly, thereby moving the upper rim of the flared section 29a into contact with the lower rim of the conical portion 32. The upward travel of the neck 29 is arrested by the bracket 26 which is positioned to establish a sufficient amount of contact between the upper rim of flared section 29a and the lower rim of conical portion 32, for a proper seal.

The burners 33 are turned off before the rim of section 29a becomes excessively molten and "runs," so that a satisfactory seal is produced between the vitreous neck portion and the conical portion. The handle 55 is now turned to raise the burner ring 39 into its uppermost position and the burners 38 are ignited to heat locally the flange 40. The motor 14 continues to rotate the conical portion 32 to provide uniform heating of the flange 40. Air is introduced through the rubber tube 22 and rotary air seal 21 into the air tube 20 and, therefore, into the interior of the conical portion 32 to prevent the edge of the window 56 from sagging during the window sealing operation. It is usual practice to provide a small aperture 27a in the cork 27 to allow some of the air to escape and avoid excessive pressure in the interior of the conical portion 32.

After the edge of the window 56 has reached a plastic state, the burners 38 are turned off and the edge settles into the flange 40, sealing the window to the conical portion 32. The handle 55 is now rotated dropping the burner ring 39 to its lowermost position, to enable an operator to place tongs around the conical portions 32 to remove the assembly. The envelope may then be placed in an annealing oven for a certain interval (for example 5 minutes at 600°), removed and allowed to cool to room temperature.

This invention provides, therefore, apparatus for fabricating envelopes of cathode-ray tubes in which the conical portion of the envelope is held with its axis in a vertical position, and the neck and window portions thereof sealed to the conical portion while it is in this position, thus enabling a single mechanism to carry out the sealing together of these portions.

While a particular embodiment of the invention has been shown and described modifications may be made,

I claim:

1. Apparatus for sealing together a vitreous neck portion and a metallic conical portion of a cathode-ray tube envelope comprising: a supporting table; a first vertically extending tubular member rotatably supported by said table; a driving mechanism mechanically coupled to said first tubular member for imparting rotational movement thereto; a second vertically extending tubular member slidably mounted coaxially within said first tubular member for rotation therewith; a supporting structure secured to said first tubular member for supporting said conical portion in a vertical position with its large end upward; means, including a cork and a plurality of resilient fingers, secured to said second tubular member for supporting said neck portion in a vertical position coaxially with said conical portion but spaced below the lower small end thereof; heating elements disposed adjacent said lower end of said conical portion; and a lifting mechanism mechanically coupled to said second tubular member for raising said second tubular member a predetermined amount to bring the upper section of said neck portion in contact with the lower end of said conical portion.

2. Apparatus for sealing together a vitreous neck portion, a metallic conical portion having a flange at its large end, and a transparent viewing plate portion of a cathode-ray tube envelope comprising: a supporting table; a first vertically extending tubular member rotatably supported by said table; a driving mechanism mechanically coupled to said first tubular member for imparting rotational motion thereto; a second vertcally extending tubular member slidably mounted coaxially within said first tubular member for rotation therewith; a first supporting structure secured to said first tubular member for supporting said conical portion in a vertical position with its large end upward and with said viewing plate resting in said flange; a second supporting structure secured to said second tubular member for supporting said neck portion in a vertical position coaxially with said conical portion but spaced below the lower small end thereof; a first group of heater elements disposed adjacent said lower end of said conical portion; a lifting mechanism mechanically coupled to said second tubular member for raising said second tubular member a predetermined amount to bring the upper section of said neck portion in contact with the lower end of said conical portion; a pair of vertically extending longitudinally movable support rods; a second group of burners supported by said support rods; and means mechanically coupled to said support rods for lowering said second group of burners and raising said second group to a position into close proximity with said flange of said conical portion.

3. Apparatus for sealing together a vitreous neck portion, a metallic conical portion having a flange at its large end, and a transparent viewing plate portion of a cathode-ray tube envelope comprising: a supporting table; a first vertically extending tubular member rotatably supported by said table; a driving mechanism mechanically coupled to said first tubular member for imparting rotational motion thereto; a second vertically extending tubular member slidably mounted coaxially within said first tubular member for rotation therewith; a spindle secured to said first tubular member; an annular bracket mounted on said spindle for supporting said conical portion in a vertical position with its large end upward and with said viewing plate resting in said flange; means, including an air seal and a plurality of resilient fingers, secured to said second tubular member for supporting said neck portion in a vertical position coaxially with said conical portion but spaced below the lower small end thereof; a first group of heater elements disposed adjacent said lower end of said conical portion; a lifting mechanism mechanically coupled to said second tubular member for raising said second tubular member a predetermined amount to bring the upper section of said neck portion in contact with the lower end of said conical portion; means, including said second tubular member, for introducing air pressure into the interior of said conical portion; a pair of vertically extending longitudinally movable support rods; a second group of burners supported by said support rods; and means mechanically coupled to said support rods for lowering said second group of burners and raising said second group into close proximity with said flange of said conical portion.

4. Apparatus for sealing together a vitreous neck portion, a metallic conical portion having a flange at its large end, and a transparent viewing plate portion of a cathode-ray tube envelope comprising: a supporting table; a first vertically-extending tubular member supported by said table; a second vertically-extending tubular member slidably mounted coaxially within said first tubular member; a first supporting structure secured to said first tubular member for supporting said conical portion in a vertical position with its large end upward and with said viewing plate resting in said flange; a second supporting structure secured to said second tubular member for supporting said neck portion in a vertical position coaxial with said conical portion but spaced below the lower small end thereof; a first group of heater elements disposed adjacent said lower end of said conical portion for effecting a seal between said neck portion and said conical portion; means for causing predetermined longitudinal movement between said tubular members to bring the upper section of said neck portion into contact with the lower end of said conical portion; a second group of burners supported adjacent the large end of said conical portion for effecting a seal between said conical portion and said viewing plate portion; and a driving mechanism for causing rotational motion between said tubular members and said heating elements.

5. Apparatus for sealing together a vitreous neck portion, a metallic conical portion having a flange at its large end, and a transparent viewing plate portion of a cathode-ray tube envelope comprising: a supporting table; a first vertically-extending tubular member rotatably supported by said table; a driving mechanism mechanically coupled to said first tubular member for imparting rotational motion thereto; a second vertically-extending tubular member slidably mounted coaxially within said first tubular member for rotation therewith; a first supporting structure secured to said first tubular member for supporting said conical portion in a vertical position with its large end upward and with said viewing plate resting in said flange; a second supporting structure secured to said second tubular member for supporting said neck portion in a vertical position coaxially with said conical portion but spaced below the lower small end thereof; a first group of heater elements disposed adjacent said lower end of said conical portion for effecting a seal between said neck portion and said conical portion; means for causing predetermined longitudinal movement between said tubular members to bring the upper section of said neck portion into contact with the lower end of said conical portion; and a second group of burners supported adjacent said large end of said conical portion for effecting a seal between said conical portion and said viewing plate portion.

6. Apparatus for sealing together a vitreous neck portion, a metallic conical portion having a flange at its large end, and a transparent viewing plate portion of a cathode-ray tube envelope comprising: a supporting table; a first vertically-extending tubular member rotatably supported by said table; a driving mechanism mechanically coupled to said first tubular member for imparting rotational motion thereto; a second vertically-extending tubular member slidably mounted coaxially within said first tubular member for rotation therewith; a first supporting structure secured to said first tubular member for supporting said conical portion in a vertical position with its large end upward and with said viewing plate resting in said flange; a second supporting structure secured to said second tubular member for supporting said neck portion in a vertical position coaxially with said conical portion but spaced below the lower small end thereof; a first group of heater elements disposed adjacent said lower end of said conical portion for effecting a seal between said neck portion and said conical portion; a lifting mechanism mechanically coupled to said second tubular member for raising said second tubular member a predetermined amount to bring the upper section of said neck portion into contact with the lower end of said conical portion; and a second group of burners supported adjacent said large end of said conical portion for effecting a seal between said conical portion and said viewing plate portion.

7. Apparatus for sealing together a vitreous neck portion, a metallic conical portion having a flange at its large end, and a transparent viewing plate portion of a cathode-ray tube envelope comprising: a supporting table; a first vertically-extending tubular member rotatably supported by said table; a driving mechanism mechanically coupled to said first tubular member for imparting rotational motion thereto; a second vertically-extending tubular member slidably mounted coaxially within said first tubular member for rotation therewith; a first supporting structure secured to said first tubular member for supporting said conical portion in a vertical position with its large end upward and with said viewing plate resting in said flange; a second supporting structure secured to said second tubular member for supporting said neck portion in a vertical position coaxially with said conical portion adjacent the lower small end thereof; a first group of heater elements disposed adjacent said lower end of said conical portion for effecting a seal between said neck portion and said conical portion; means for causing predetermined longitudinal movement between said tubular members to bring the upper section of said neck portion into sealing contact with the lower end of said conical portion; and a second group of burners supported adjacent said large end of said conical portion for effecting a seal between said conical portion and said viewing plate portion.

References Cited in the file of this patent

UNITED STATES PATENTS

| | | |
|---|---|---|
| 829,538 | McDonnell | Aug. 28, 1906 |
| 1,461,155 | Madden et al. | July 10, 1923 |
| 1,779,311 | Gates | Oct. 21, 1930 |
| 1,869,533 | Wetmore | Aug. 2, 1932 |
| 2,477,332 | Garbe | July 26, 1949 |